July 26, 1966
H. T. PENTECOST
3,262,227
COVER ASSEMBLY FOR ACCESS HATCH
Filed April 17, 1964
2 Sheets-Sheet 1
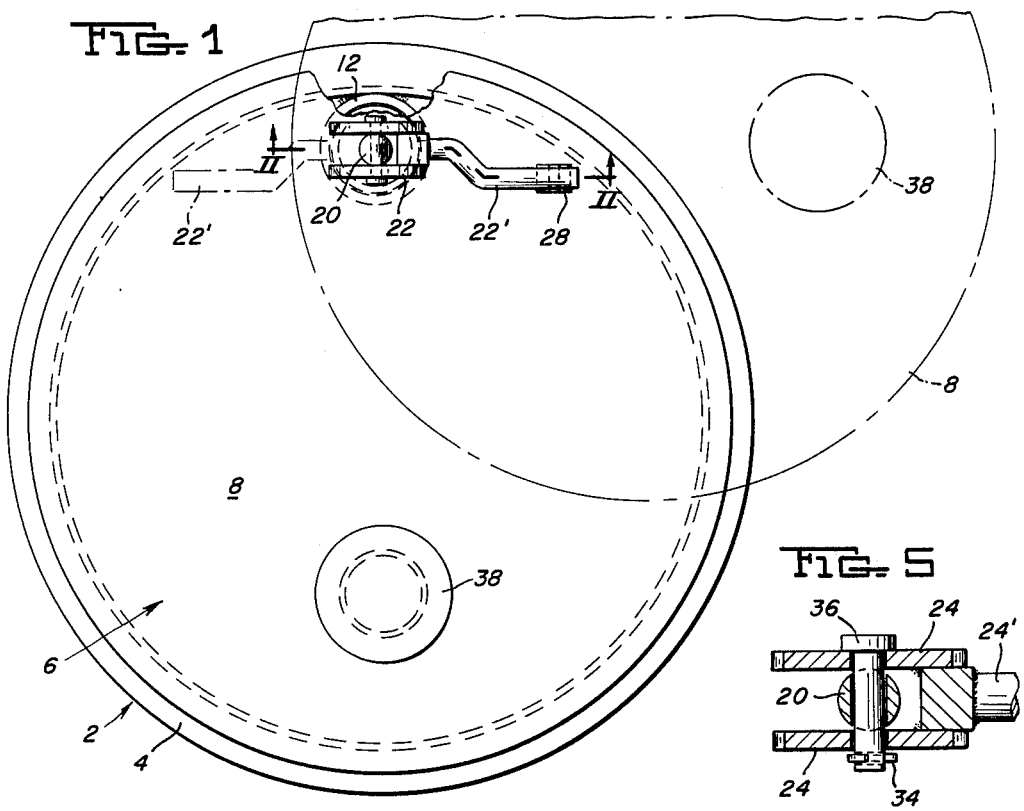
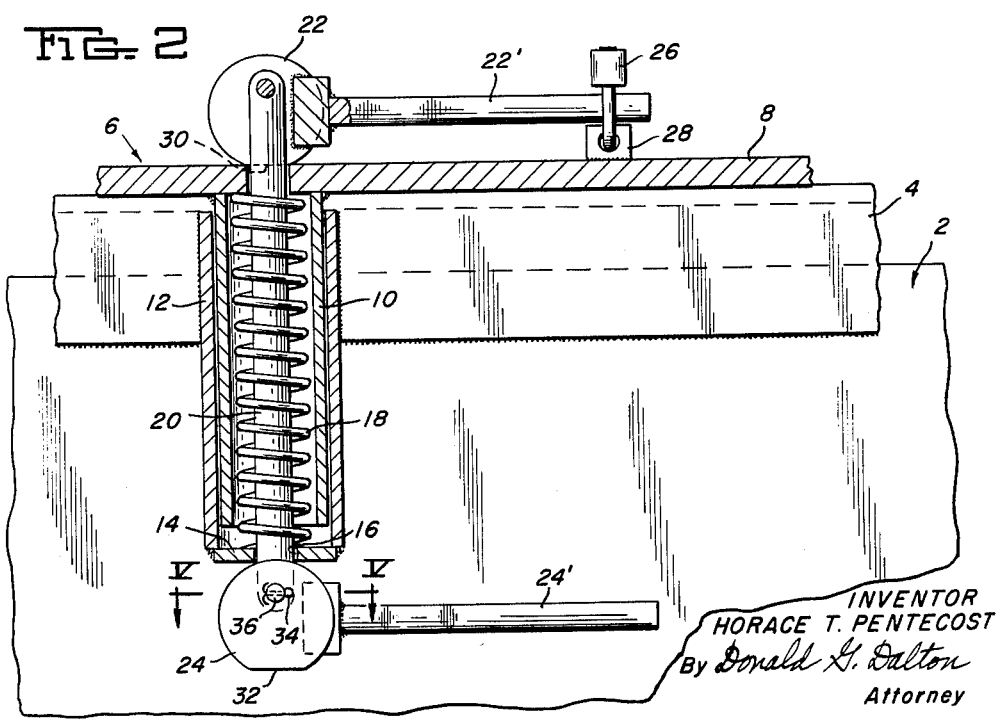
INVENTOR
HORACE T. PENTECOST
By Donald G. Dalton
Attorney July 26, 1966  H. T. PENTECOST  3,262,227
COVER ASSEMBLY FOR ACCESS HATCH
Filed April 17, 1964  2 Sheets-Sheet 2
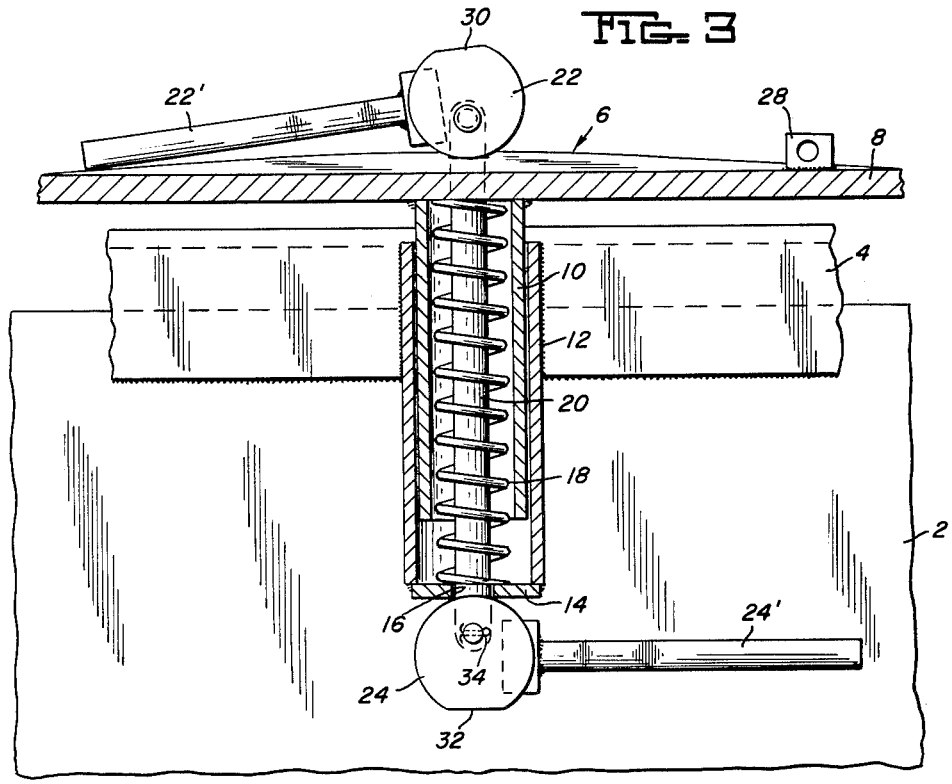
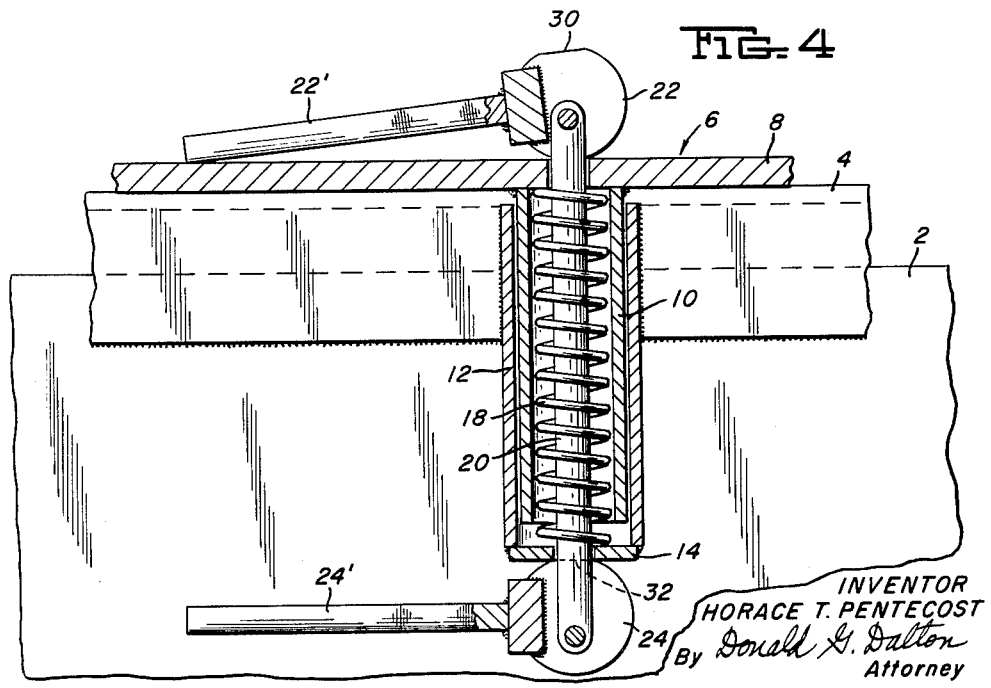
INVENTOR
HORACE T. PENTECOST
By Donald G. Dalton
Attorney United States Patent Office 3,262,227
Patented July 26, 1966

3,262,227
COVER ASSEMBLY FOR ACCESS HATCH
Horace T. Pentecost, San Pedro, Calif., assignor to United States Steel Corporation, a corporation of Delaware
Filed Apr. 17, 1964, Ser. No. 360,636
2 Claims. (Cl. 49—354)

The present invention relates generally to hatch covers and, more particularly, to an improved hingeless cover especially suitable for covering the access or entry hatch of a fallout shelter.

Prior to my invention, most, if not all, fallout shelter entry covers were hinged to an edge of the access hatch so that a lifting force was required to uncover the hatch. In order to be blast resistant, it is necessary that fallout shelter covers be relatively heavy and, consequently, heavy hinged covers required counterbalancing means to facilitate the handling thereof in opening and closing the hatch. Such counterbalancing means were necessarily quite elaborate and expensive since they were required to accurately counterbalance the heavy covers for their total travel from a fully closed to a fully opened position.

Another serious defect apparent in fallout shelter access hatch covers prior to my invention was the lack of efficient means for locking the covers in closed position. All of the prior art fallout shelter hatch cover locking means with which I am acquainted were susceptible to easy jamming from outside the shelter.

It is, accordingly, the primary object of my invention to provide an improved fallout shelter entry hatch cover which does not require hinges but rather is mounted on a vertical pivot for swinging movement in a horizontal plane from closed to open position or vice versa.

It is another object of my invention to provide a hatch cover of the character described having unique securing means whereby the hatch can be locked in closed position from either the outside or the inside of the hatch and which, when operated to unlock the cover, automatically raises the cover above the hatch rim so that the cover can be easily swung away from the hatch opening.

As a corollary to the above object, it is another object of my invention to provide a fallout shelter entry hatch cover having unique securing means as described above whereby the cover can be unlocked from inside the hatch even though it has been locked in closed position from outside the fallout shelter.

These and other objects will become more apparent after referring to the following specification and attached drawings, in which:

FIGURE 1 is a plan view showing the cover of the invention by solid lines in closed position on a fallout shelter entry hatch and in partially open position by broken lines;

FIGURE 2 is a vertical sectional view taken along the line II—II of FIGURE 1 showing the cover of the invention in closed position locked from the outside of the hatch;

FIGURE 3 is a view similar to FIGURE 2 but showing the cover of the invention in unlocked position;

FIGURE 4 is a view similar to FIGURE 2 but showing the cover of the invention in closed position locked from the inside of the hatch; and FIGURE 5 is a cross-sectional view taken along the line V—V of FIGURE 2.

Referring more particularly to the drawings, reference numeral 2 designates a fallout shelter entry or access hatch having a rim 4 extending along its upper edge. Reference numeral 6 designates generally the cover assembly of my invention which includes a flat, heavy metal plate 8 of a configuration matching the shape of but slightly greater in diameter than the hatch opening.

A pivot tube 10 is welded or otherwise rigidly affixed to the bottom surface of the plate 8 and projects downwardly therefrom to fit rotatably into a bearing sleeve 12 which is welded or otherwise rigidly secured to the inner surface of the rim 4 and extends downwardly into the hatch. A plate 14 having a center hole 16 therethrough is welded to and closes the lower end of the bearing sleeve 12 to provide an abutment for the lower end of a helical compression spring 18 which is disposed within the pivot tube 10. The upper end of the compression spring 18 bears against the bottom surface of the plate 8 and constantly biases the cover 6 upwardly of the hatch rim 4.

A link 20 extends coaxially through the tube 10 and the spring 18 with its lower end projecting through the center hole 16 in the plate 14 and its upper end projecting through a hole in the plate 8. Cams 22 and 24 are eccentrically mounted for rotation on the upper and lower projecting ends, respectively, of the link 20. The cams 22 and 24 are provided with handles 22' and 24' whereby the cams can be rotated relative to the ends of the link to which they are attached from a locking position forcing the plate 8 tightly against the rim 4 of the hatch or to unlocking or open position wherein they exert no pressure on the plate. FIGURE 2 shows the outside cam 22 rotated to locking position and secured therein by means of a lock 26 which fastens the handle 22' of the cam to a block 28 welded or otherwise rigidly fixed on the plate 8. In this position, the long radius of the eccentrically-mounted cam 22 is directed toward the plate 8 so that the link 20 is extended upwardly and a flat portion 30 of the periphery of cam 22 bears against plate 8 forcing it downwardly against the rim 4 causing spring 18 to compress. When the upper end of link 20 is thus projected or extended upwardly, the cam 24 on the opposite end of the link is in a position wherein its short radius is directed toward the plate 14.

FIGURE 3 shows the cover assembly 6 in unlocked condition and the plate 8 being urged upwardly above the rim 4 by the spring 18. In this position, the cam 22 has been rotated 180 degrees from the locking position shown in FIGURE 2. With the plate 8 thus raised above the rim 4 by the spring 18, it can easily be swung in a horizontal plane either to the right or left to open the hatch 2.

When the cover assembly is in unlocked condition, as shown in FIGURE 3, both cams 22 and 24 have been rotated to a position wherein their short radii extend toward each other.

FIGURE 4 shows the cover assembly of the invention in locked condition secured from the inside by cam 24. To thus lock the cover assembly from the inside, the cam 24 is rotated by the handle 24' to extend the lower projecting end of the link 20 outwardly of the bottom of the bearing sleeve 12. After cam 24 has been thus rotated, the long radius thereof extends toward the plate 14 and the plate 14 is engaged by a flat portion 32 on the periphery of the cam 24, as shown in FIGURE 4. When the lower projecting end of the link 20 is thus extended downwardly from the bearing sleeve 12, plate 8 is forced downwardly under cam 22 into tight engagement with the rim 4, and spring 18 is compressed by the plate 8.

It will be seen that when one cam is actuated to pull the plate 8 down tight against rim 4 and spring 18, the other cam cannot be actuated. This feature prevents locking in of occupants in the fallout shelter after the occupants have secured the cover assembly by means of the inside cam 24, as shown in FIGURE 4. If the inside cam is in unlocked position and the outside cam 22 is inadvertently latched while persons are in the shelter, the cover assembly can be unlocked by removing the safety cotter pin 34 from the pin 36 which secures the cam 22 to the lower projecting end of the link 20, as best shown in FIGURES 2 and 5.

If desired, a vent opening covered by a ventilator 38 may be provided in the cover plate 8.

Although the cover assembly of the invention has been shown in conjunction with a circular hatch or opening, it will be understood that it may be used for hatches or openings other than those circular in shape. As mentioned hereinbefore, the plate 8 must be of a configuration to match the opening to be covered.

While one embodiment of my invention has been shown and described, it will be apparent that other adaptations and modifications may be made without departing from the scope of the following claims.

I claim:

1. In a hatch defined by a peripheral frame, a hatch closure comprising a plate having a bottom surface adapted to cover said hatch, a pivot tube having one end rigidly affixed to the bottom surface of said plate adjacent an edge thereof and the other end extending into said hatch, a bearing sleeve attached to one side of the interior of said hatch frame and surrounding said tube, said tube being rotatable in said sleeve, a wall having a center hole therethrough on the end of said sleeve remote from said plate, a link coaxial with said tube, respective ends of said link projecting slidably through said plate and the hole in said wall, compression spring means in said tube acting between the plate and the said sleeve wall normally biasing said plate away from said hatch, and cam means carried by each of the projecting ends of said link, said cam means being adapted to cooperate with said plate and said wall, respectively, to lock said link in position extended in one direction and lock said plate in position covering said hatch.

2. A hatch closure as defined by claim 1 in which said cam means includes an eccentric cam wheel rotatably mounted on said link, and a handle attached to said cam wheel whereby said cam wheel is rotated.

References Cited by the Examiner

UNITED STATES PATENTS

| 1,070,128 | 8/1913 | Gross | 220—33 |
| 2,339,006 | 1/1944 | Folmsbee | 220—33 X |
| 2,440,764 | 5/1948 | Wilson | 189—46 |
| 2,644,989 | 7/1953 | Parkes | 20—16 |

HARRISON R. MOSELEY, *Primary Examiner.*
KENNETH DOWNEY, *Examiner.*